Nov. 25, 1924.

A. K. SCHAAP, JR 1,516,829

LIQUID LEVEL GAUGE

Filed May 4, 1923

INVENTOR
ALEXANDER K. SCHAAP, JR.
BY
Charles H. Theron
ATTORNEY

Nov. 25, 1924.

A. K. SCHAAP, JR 1,516,829

LIQUID LEVEL GAUGE

Filed May 4, 1923

INVENTOR
ALEXANDER K. SCHAAP, JR
BY
ATTORNEY

Patented Nov. 25, 1924.

1,516,829

UNITED STATES PATENT OFFICE.

ALEXANDER K. SCHAAP, JR., OF BROOKLYN, NEW YORK.

LIQUID-LEVEL GAUGE.

Application filed May 4, 1923. Serial No. 636,551.

*To all whom it may concern:*

Be it known that I, ALEXANDER K. SCHAAP, Jr., residing in Brooklyn, county of Kings, and State of New York, have invented certain new and useful Improvements in a Liquid-Level Gauge, of which the following is a specification.

This invention relates to indicators, and more particularly to an indicating device operating upon the hydrostatic principle for indicating the liquid content in a tank or other receptacle. In the present instance the device is adapted to indicate the quantity of gasoline in the fuel supply tank of an automobile where the vacuum feed principle is employed to withdraw the liquid fuel from the supply tank.

One of the objects of the invention is to provide in an indicator of the above character new and improved means for rectifying and correcting the gauge.

Another object is to provide a device of the above character, wherein the liquid indicating medium in the gauge head will not surge or fluctuate under any conditions of service, but will remain steady, and thereby at all times give an accurate indication.

Another object of the invention is to provide a device of the above character, which will not become clogged by foreign substances in the liquid fuel, and which will not freeze up in the event that water rests in the bottom of the tank.

Other objects and aims of the invention, more or less specific than those referred to above, will be in part obvious and in part pointed out in the course of the following description of the elements, combinations, arrangements of parts and applications of principles constituting the invention; and the scope of protection contemplated will be indicated in the appended claims.

In the accompanying drawings, wherein I have illustrated preferred forms of embodiment of my invention:

Figure 1:
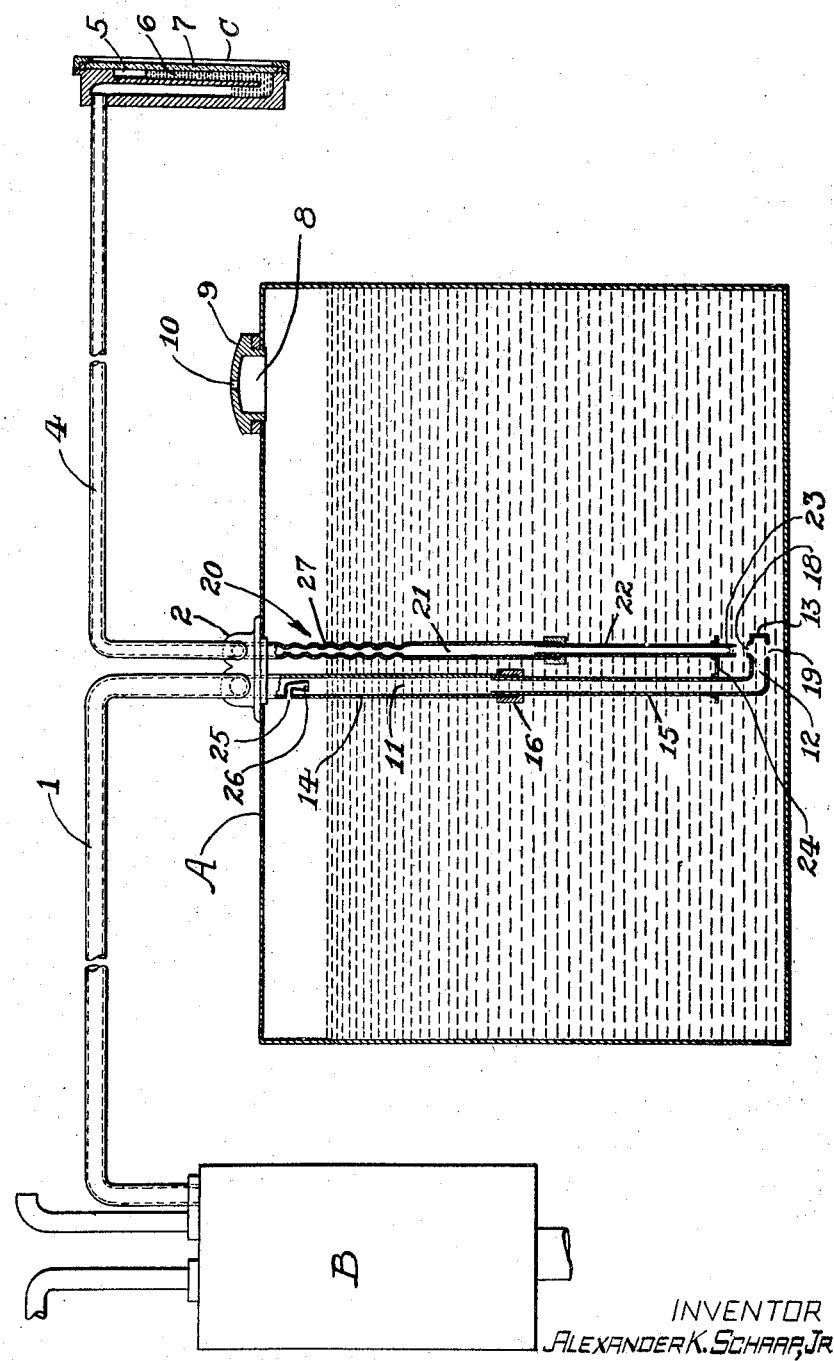
Figure 1 is a schematic view illustrating my invention.

Referring now to the drawings, wherein similar reference characters refer to similar parts throughout the several views thereof, the reference character A denotes a gasoline supply tank, B the usual vacuum tank, and C the gauge. In practice in a gasoline supply system of the vacuum type, the gasoline supply tank A is usually located under the body of the car behind the rear axle; the vacuum tank B at a point under the hood of the automobile above the carburetor, and the gauge C is preferably located on the dash in a position to be observed by the driver of the vehicle.

The function of the vacuum tank B is to draw gasoline through the conduit 1 from the gasoline supply tank, mechanism not shown being employed in the vacuum tank, to trip or operate the valve mechanism when a sufficient quantity of gasoline has been drawn into the vacuum tank, such operation permitting the gasoline remaining in the conduit 1 to return by gravity into the gasoline supply tank.

In the present instance the conduit 1 leads from an elbow 2, having an air tight connection with the top of the gasoline supply tank A, being connected with said elbow as by means of the coupler member 3. Similarly connected with the top of the gasoline tank is a conduit 4, which leads to the gauge C, which as above described, is preferably located upon the dash of the car. The gauge C is provided with a U-shaped tube 5, which contains a quantity of liquid 6, the latter constituting the indicating medium, through its co-operation with a suitable scale, not shown, provided in the front transparent wall 7 of the gauge.

The top of the gasoline tank is provided with the usual aperture 8, through which the gasoline is introduced into the tank, and which is closed by the cap 9 having the usual vent 10, through which air is admitted to the supply tank as the gasoline is drawn therefrom through the conduit 1.

The structure thus far described is old in the art, and constitutes no part of my present invention, which I shall now proceed to describe.

Extending downwardly into the tank from the elbow 2, is a conduit 11, the lower end of which is located as near the bottom wall of the tank as is practicable, said lower end being provided in the present instance with a lateral extension 12 having the closed end 13. The conduit 11 is preferably made in two parts, indicated at 14 and 15, so constructed as to lie in telescoping relation, as at 16, a clamp nut 17 being employed to hold the telescoping parts when once adjusted in fixed relation. The object of arranging the parts of this conduit in telescoping relation is to provide means whereby the device may be adapted in tanks of varying depths.

The lower end 12 of the conduit 11 is provided with an upwardly directed aperture 18, underneath which is provided a registering aperture 19. The conduit 11, of course, is in direct connection with the conduit 1 through the elbow 2.

Extending downwardly into the gasoline supply tank is a second conduit 20, likewise formed of the telescoping sections 21 and 22, the lower end 23 of the conduit 20 being located directly above the aperture 18 in the conduit 11, and slightly spaced therefrom, as clearly shown in the drawings.

The lower ends of the conduits 11 and 20 are preferably held in fixed relation with each other, as by means of the spacing member or bracket 24, which embraces the lower ends of both conduits.

Located in the conduit 11, near the upper end thereof, within the gasoline supply tank, is a vent 25, which vent within the conduit 11, is preferably provided with a downwardly extended open-ended nipple 26. The conduit 20, near its upper end, as shown in Figures 1, 2 and 5, is preferably pinched in opposite directions, as indicated at 27, the object of which construction is to prevent particles of gasoline from being carried by air bubbles upwardly into the conduit 4, and through said conduit into the indicator gauge C.

In the embodiment of my invention shown in Figure 4, the construction is similar to that already described in connection with Figures 1 and 2, except that the lower end 28 of the conduit 20, is enlarged, or given an inverted bell-shaped construction, for a purpose which will be later described.

Figure 2:
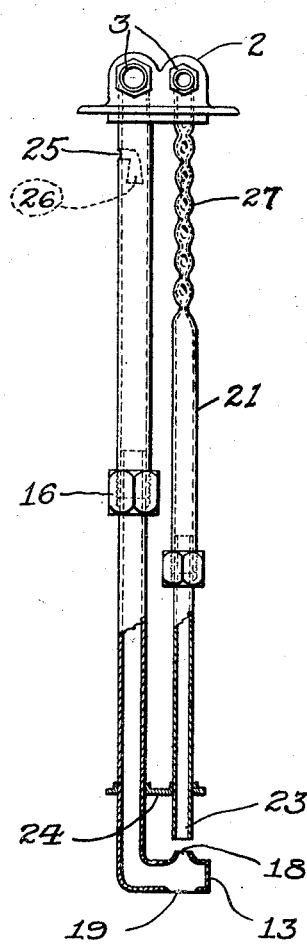
Figure 2 is an elevational view, partly in section, showing the means employed within the gasoline supply tank for rectifying the gauge.

In this embodiment of my invention for the pinched in construction of this conduit, illustrated in Figures 1 and 2, a ball-chain 29 is suspended in said conduit, sufficient space being provided between the balls forming a part of the chain to permit air to pass upwardly through the conduit 20 into the conduit 4. The lower bell-shaped end 28 is located directly above the aperture 18 of the conduit 11, as in the first described embodiment of my invention.

Figure 5:
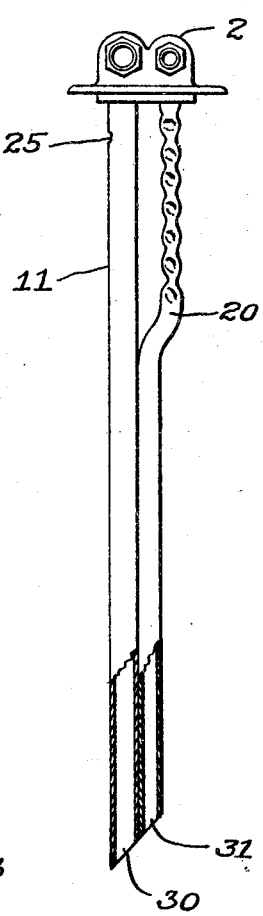
Figure 5 is a similar view, showing still another embodiment of my invention.
Figure 3:
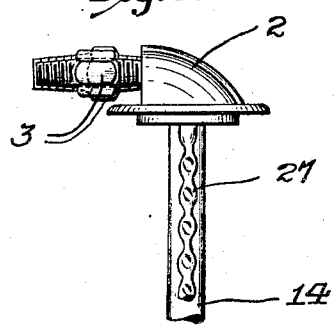
Figure 3 is an elevational view showing a detail of construction.

In the embodiment of the invention shown in Figure 5, the conduits 11 and 20 preferably lie in engagement, as shown, the lower ends of said conduits being cut off at an angle, as indicated at 30 and 31, the lower end of the conduit 20 being disposed above the lower end of the conduit 11, so that air passing downwardly through the conduit 11, and being discharged through its lower end, will find its way through the lower open end of the conduit 20.

Figure 4:
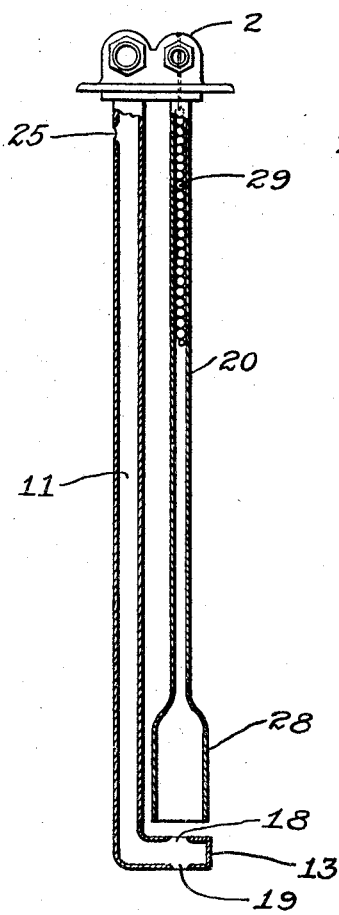
Figure 4 is a view similar to Figure 2, showing another embodiment of my invention.

In the embodiment of my invention shown in Fig. 4 and Fig. 5 the vent 25 opens directly into the conduits 11, the nipple 26 employed in the first described embodiment of my invention being omitted.

Having thus described my invention, the operation thereof, may now be understood.

Referring to Figure 1 of the drawing, and assuming that a quantity of liquid has been provided in the indicator gauge C, it will be observed that a hydrostatic balance is established between the body of the liquid fuel in the supply tank A and the column of liquid in the U-shaped tube of the gauge C; the pressure of the liquid fuel exerted upon the air imprisoned in the conduits 20 and 4 maintaining the said hydrostatic balance, whereby the level of the indicating medium in the U-shaped tube, in conjunction with the scale, will indicate the quantity of liquid fuel in the supply tank. It will be understood, of course, that the relativities of the indicator medium, the scale calibration of the gauge, and the capacity of the gasoline tank, have previously been determined, whereby the gauge will provide an accurate indication for a given sized supply tank.

In the embodiment of my invention shown in Figs. 1 and 2, during the operation of the vacuum tank, liquid fuel will be drawn through the conduits 11 and 1 into the vacuum tank. When a sufficient quantity of liquid fuel has been drawn into the vacuum tank the usual float therein operates to trip thereby releasing the suction upon conduit 14, and the fuel contained in said conduit is permitted to flow back into the supply tank, this recessional flow of liquid fuel will draw a quantity of air from within the gasoline supply tank, through the vent 25, such air being carried downwardly through the conduit 11, and being discharged from the lower end thereby in minute bubbles through the aperture 18. These bubbles of air will thereupon rise and enter the lower end of the conduit 20.

Thus the tendency of the gauge to fluctuate, due to the varying pressures in the gasoline supply tank, and the varying temperatures, is being constantly rectified, inasmuch as more than a sufficient quantity of air to make the correction or rectification, is discharged against the open end 23 of the conduit 21 at each recessional flow of the liquid fuel from the vacuum tank.

It is intended that the construction of the vent 1 shall be such that no air will be drawn into the gasoline feed conduit during the operation of the vacuum tank in drawing gasoline from the supply tank to the conduit. It will be noted that when the liquid fuel flows upwardly through the conduit 11, through the action of the vacuum tank, there will be a tendency of the gasoline to flow outwardly through the vent 25. There is also a suction exerted on said vent during the feed flow of the liquid fuel.

When, however, the liquid fuel flows in the opposite direction, this hydrostatic balance will be destroyed, air will be drawn into the conduit 11 through the vent 25, and will be commingled or entrained with the liquid fuel flowing back into the gasoline supply tank, so that the air can be discharged at the bottom of the tank, to be received into the lower end of the conduit 20, as has already been described.

The provision of the aperture 19 immediately beneath the air discharged aperture 18 of the conduit 11, permits the gasoline to flow back freely into the gasoline tank, whereby the liberated air bubbles will immediately rise, through the aperture 18, so that they will come in contact with the lower end of the conduit 20.

In the embodiment of my invention shown in Figure 4, the purpose of the bell-shaped end of the conduit 20 is to provide for a greater quantity of air being discharged into said conduit, in the event that it is desirable to operate a mechanically operated pressure gauge, that is to say, a gauge having an indicator or pointer, rather than a U-tube gauge, such as is shown in the drawings.

In the embodiment of my invention shown in Figure 5, it will be noted that the air bubbles entrained in the liquid fuel being discharged through the end 30 of the conduit 11, will rise and tend to enter the end 31 of the conduit 20.

It will accordingly be seen that I have provided a construction well adapted to attain, among others, all the aims and objects above pointed out, in a very simple, yet efficient manner.

It will be further noted that the fluctuating or surging of the indicator medium present in gauges as hitherto constructed and due to the action produced upon the body of the liquid fuel by the suction of the vacuum tank are eliminated due to the fact that in the present instance the opening 19 is provided at the lowermost portion of the suction conduit 11, the said opening 19 being of sufficient diameter to satisfy the suction of the vacuum tank exerted through the conduit 11 without causing said suction to vary the pressure in the conduit 20.

I have also found that during the operation of my improved pressure gauge that a meniscus or air bubble forms on the submerged open end of the gauge conduit during the operation of the device. This also assists in maintaining the stability in the liquid indicating medium in the gauge.

While I have shown and described my invention as applied to a gasoline supply and feeding system for a motor vehicle, it is obvious, of course, that it may be readily adapted for other analogous purposes.

As many changes could be made in this construction without departing from the scope of the following claims, it is intended that all matter contained in the above description or shown in the accompanying drawing, shall be interpreted as illustrative only and not in a limiting sense.

Having thus described my invention what I claim as new and desire to secure by Letters Patent is:

1. In a device of the class described, in combination, a liquid supply tank, an intermittently operating suction system including a suction device and a conduit extending from a position near the bottom of the supply tank to the suction device, a gauge system including a device for indicating the level of the liquid in the storage tank, and a conduit which extends from a point near the bottom of the supply tank to the gauge, said first and second conduits having their lower ends so arranged that the lower open end of the first named conduit is below the lower open end of said second named conduit, and means for entraining air in the liquid in said first named conduit during the suction flow and the return flow of the liquid.

2. In a device of the class described, in combination, a liquid supply tank, an intermittently operating suction system including a suction device and a conduit extending from a position near the bottom of the storage tank to the suction device, a gauge system including a device for indicating the level of the liquid in the storage tank, and a conduit which extends from a point near the bottom of the supply tank to the gauge, said first and second conduits having their lower open ends so arranged that the lower open end of the first named conduit is below the lower open end of said second named conduit, and means for admitting air into said first named conduit when the liquid is falling by gravity into the storage tank, said air being discharged with the liquid through the lower open end of said conduit to be received in the corresponding end of said second named conduit.

3. In a device of the class described, the combination with a liquid supply tank, an intermittently operating vacuum tank and a gauge, of a conduit extending from the vacuum tank through the top wall of the supply tank to a position adjacent the bottom wall thereof, said conduit having an upwardly directed air exit aperture at its lower end, a conduit leading from the gauge through the top wall of the supply tank to a position adjacent the bottom wall thereof, and having an air entrance aperture disposed vertically above the air exit aperture of said first named conduit, and in spaced relation therewith, and means for admitting air into said first named conduit when the liquid descends therethrough by gravity and discharges into the supply tank.

4. In a device of the class described, the combination with a liquid supply tank, an intermittently operating vacuum tank and a hydrostatic gauge, of a conduit extending from the vacuum tank downwardly into the supply tank and terminating in a lateral extension adjacent the bottom wall of the supply tank, said lateral extension being provided with an upwardly directed air exit aperture, a conduit leading from the gauge to a position near the bottom wall of the supply tank, said conduit having its open end disposed directly above said air exit aperture of said first named conduit and in spaced relation therewith, and said first named conduit having an aperture communicating with the air space of the liquid supply tank near the top wall thereof.

5. In a device of the class described, in combination, a liquid supply tank, a suction system having an intermittently operating suction device, and a gauge system having a gauge operable by air pressure, the suction system including a conduit extending from the suction device through the upper wall of the supply tank to a position adjacent the bottom wall thereof, the gauge system including a conduit extending through the upper wall of the supply tank to a position adjacent the bottom wall thereof, said first and second named conduits being provided with air exit and air entrance apertures at their lower ends, the air exit aperture of said first named conduit being located below the air entrance aperture of the second-named conduit, means for entraining air in the liquid in said first-named conduit during the suction flow and during the return flow of the liquid through said first named conduit.

6. In a device of the class described, in combination, a liquid supply tank, a suction system having an intermittently operating suction device, and a gauge system having a gauge operable by air pressure, the suction system including a conduit extending from the suction device through the upper wall of the supply tank to a position adjacent the bottom wall thereof, the gauge system including a conduit extending through the upper wall of the supply tank to a position adjacent the bottom wall thereof, said first and second-named conduits being provided respectively with air exit and air entrance apertures at their lower ends, the air exit aperture of said first named conduit being located below the air entrance aperture of the second-named conduit, means for entraining air in the liquid in said first-named conduit during the suction flow of the liquid and its return flow through said first-named conduit, and said second-named conduit having means for breaking up air bubbles passing upwardly therethrough.

In testimony whereof, I affix my signature.

ALEXANDER K. SCHAAP, Jr.